(12) United States Patent
Inoue et al.

(10) Patent No.: US 12,358,168 B2
(45) Date of Patent: Jul. 15, 2025

(54) ROBOT

(71) Applicant: FANUC CORPORATION, Yamanashi (JP)

(72) Inventors: Toshihiko Inoue, Yamanashi (JP); Tomoyuki Motokado, Yamanashi (JP); Kazuhiro Watanabe, Yamanashi (JP); Yuuki Kouda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 44 days.

(21) Appl. No.: 18/555,033

(22) PCT Filed: Apr. 28, 2021

(86) PCT No.: PCT/JP2021/016883
§ 371 (c)(1),
(2) Date: Oct. 12, 2023

(87) PCT Pub. No.: WO2022/230077
PCT Pub. Date: Mar. 11, 2022

(65) Prior Publication Data
US 2024/0198542 A1 Jun. 20, 2024

(51) Int. Cl.
*B25J 19/00* (2006.01)
*B25J 15/00* (2006.01)

(52) U.S. Cl.
CPC ........ *B25J 19/0029* (2013.01); *B25J 15/0019* (2013.01)

(58) Field of Classification Search
CPC .......................... B25J 19/0029; B25J 15/0019
See application file for complete search history.

(56) References Cited

U.S. PATENT DOCUMENTS 4,656,329 A * 4/1987 Moerke ................ B25J 17/0241
219/136
8,220,332 B1 7/2012 Gunal

FOREIGN PATENT DOCUMENTS

| JP | 2002-247724 A | 8/2002 |
|---|---|---|
| JP | 2004201447 A | 7/2004 |
| JP | 2004320999 A | 11/2004 |
| JP | 2006251303 A | 9/2006 |
| JP | 2009122530 A | 6/2009 |
| JP | 2009-220219 A | 10/2009 |

(Continued)

OTHER PUBLICATIONS

International Search Report and Written Opinion issued for corresponding International Application No. PCT/JP2021/016883, mailed Jul. 20, 2021, with English machine translation.

*Primary Examiner* — Terence Boes
(74) *Attorney, Agent, or Firm* — Renner, Otto, Boisselle & Sklar, LLP

(57) ABSTRACT

A robot including a forearm, a wrist whose proximal end side is connected to the forearm so as to be rotatable around a first axis and to which a work tool is attached at a distal end side thereof, a flexible conduit arranged along the first axis from the forearm to a distal end of the wrist, the flexible conduit having openings at both ends thereof, and a pull-in code body arranged so as to pass through the conduit in an axis direction capable of being pulled out from at least one of the openings located at a side of the forearm of the conduit, wherein both ends of the pull-in code body are detachably fixed to positions capable of being handled from outside the conduit.

5 Claims, 10 Drawing Sheets

(56) References Cited

FOREIGN PATENT DOCUMENTS

| | | | |
|---|---|---|---|
| JP | 2010231047 | A | 10/2010 |
| JP | 2012020368 | A | 2/2012 |
| JP | 2012139060 | A | 7/2012 |
| JP | 2015033749 | A | 2/2015 |
| JP | 2015058521 | A | 3/2015 |
| JP | 2017056501 | A | 3/2017 |
| JP | 2017-159397 | A | 9/2017 |
| JP | 2017185603 | A | 10/2017 |
| JP | 2018122404 | A | 8/2018 |

* cited by examiner

ROBOT

This application is a national phase of International Application No. PCT/JP2021/016883 filed Apr. 28, 2021, which is hereby incorporated herein by reference in its entirety.

TECHNICAL FIELD

The present disclosure relates to a robot.

BACKGROUND ART

There is a known robot in which a plurality of work tools is attached to a distal end of a wrist whose proximal end side is connected to a forearm so as to be rotatable around a first axis. (See PTL 1, for example) With this robot, a flexible first conduit and a flexible second conduit, which is positioned within the first conduit, are arranged along a first axis from the forearm to the distal end of the wrist. Also, a first wire body for one of the work tools is wired within the second conduit, and a second wire body for another one of the work tools is wired in a space between the first conduit and the second conduit.

CITATION LIST

Patent Literature

{PTL 1} Japanese Unexamined Patent Application, Publication No. 2017-185603

SUMMARY

An aspect of the present disclosure is a robot including: a forearm; a wrist whose proximal end side is connected to the forearm so as to be rotatable around a first axis and to which a work tool is attached at a distal end side of the wrist; a flexible conduit arranged along the first axis from the forearm to a distal end of the wrist, the flexible conduit having openings at both ends thereof; and a pull-in code body which is arranged so as to pass through the conduit in an axis direction of the conduit and which is capable of being pulled out from at least one of the openings located at a side of the forearm of the conduit, wherein both ends of the pull-in code body are detachably fixed to positions capable of being handled from outside the conduit.

DESCRIPTION OF EMBODIMENTS

Every work tool is not always attached to a robot at the time of manufacturing the robot, and there may be a case where a work tool is attached by a user after being supplied to a place of use. For example, in such a case where a first wire body is wired when the robot is manufactured and a second wire body is wired at the place of use, the user is required to carry out a difficult work for wiring the second wire body in a narrow space between the first conduit and the second conduit.

Depending on the case or circumstance, the second wire body needs to be wired by removing the work tool, the first wire body, and the conduit which are attached to the robot at the time of manufacturing, which requires extensive work. Accordingly, it is desired to wire the wire body easily in a post-installation manner that does not require extensive work after installing the robot at a place of use.

A robot 1 according to an embodiment of the present disclosure will be described below with reference to the accompanying drawings.

Figure 1:
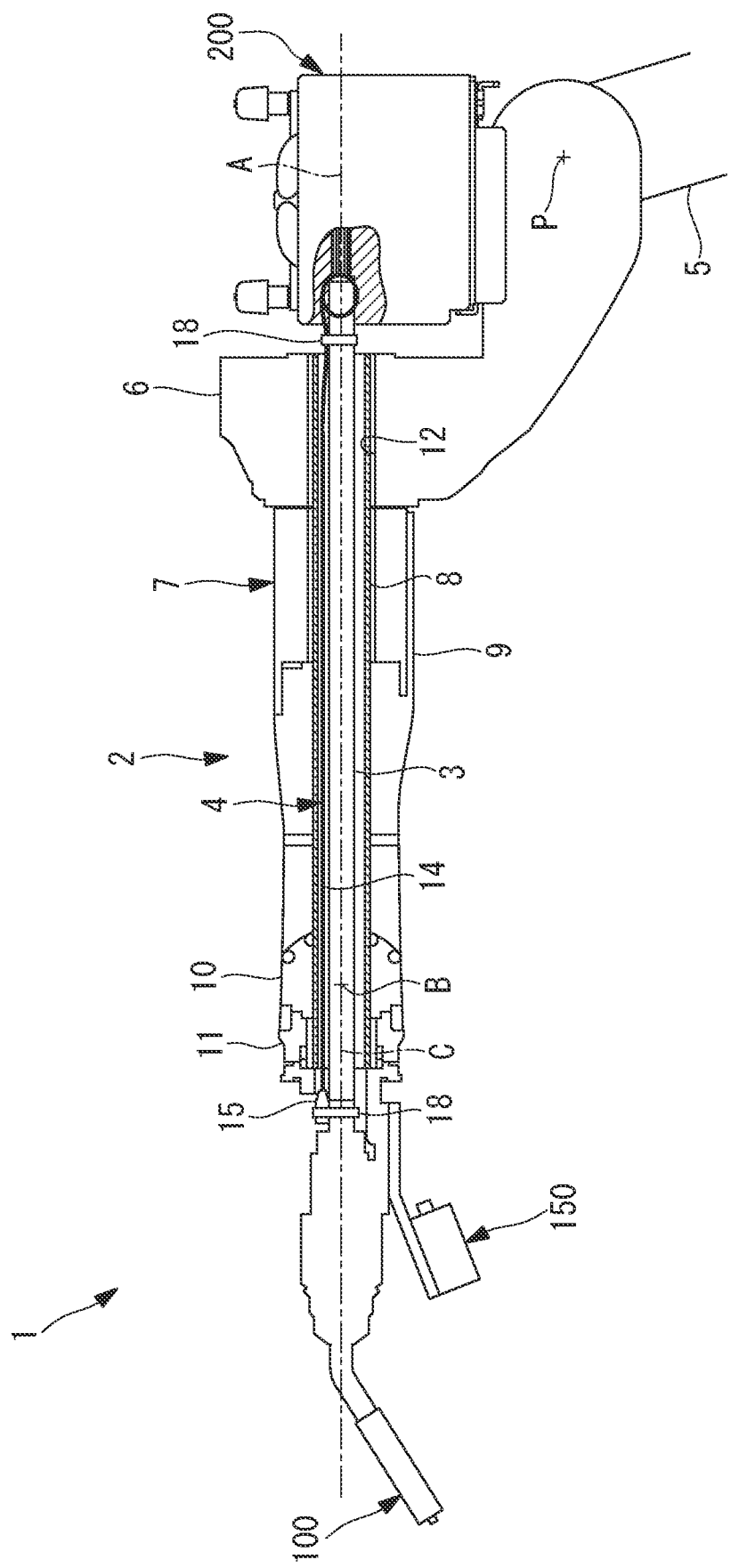
FIG. 1 is a longitudinal sectional view of a forearm and a wrist of a robot according to an embodiment of the present disclosure.

As shown in FIG. 1, the robot 1 according to this embodiment includes a robot main body 2, a work tool 100 which is attached to the robot main body 2, and a work tool controller 200. Also, the robot 1 has a first wire body (a wire body) 3 for connecting the work tool 100 and the work tool controller 200, and a pull-in rope (a pull-in code body) 4.

The robot main body 2 includes a forearm 6 which is supported at a distal end of an upper arm 5 so as to be rotatable around a horizontal axis P, a wrist 7 which is supported by the forearm 6 so as to be rotatable around a first axis A, and a flexible conduit 8 which is arranged along the first axis A from the rear portion of the forearm 6 to the distal end of the wrist 7.

The wrist 7 has a first wrist element 9 which is rotated around the first axis A, a second wrist element 10 which is rotated around a second axis B orthogonal to the first axis A, and a third wrist element 11 which is rotated around a third axis C orthogonal to the second axis B. FIG. 1 shows a state where the first axis A and the third axis C are arranged in a straight line.

The forearm 6, the first wrist element 9, the second wrist element 10, and the third wrist element 11 have a through path 12 which penetrates from the rear side of the forearm 6 to the front side of the third wrist element 11 along the first axis A in the vicinity of the first axis A.

The flexible conduit 8 is a metallic coil tube or a resin-molded tubular member, which are capable of being bent easily, for example. The conduit 8 is accommodated in the through path 12 which penetrates from the rear side of the forearm 6 to the front side of the third wrist element 11.

The work tool 100 is a welding torch and is fixed to a flange surface of a distal end of the third wrist element 11, for example.

The work tool controller 200 is a wire feeding device which controls wire feeding to the welding torch 100, and which is fixed to the rear portion of the forearm 6.

The first wire body 3 is a wire member which is guided in a conduit 8 from the wire feeding device 200 located at the rear portion of the forearm 6 to the welding torch 100 provided at the distal end of the wrist 7. The first wire body 3 includes a gas hose for supplying assist gas, a wire conduit for supplying the welding wire, a power-feed cable for supplying power to the welding torch 100, and the like.

The first wire body 3 has a cross-sectional area which is substantially smaller than that of the conduit 8, and the first wire body 3 is arranged so as to pass through the conduit 8 in the longitudinal direction, and is connected to the welding torch 100 and the wire feeding device 200 at positions located outside the openings provided at both ends of the conduit 8. A space, which has a size enough to arrange a later-described second wire body (a post-installation wire body) 13, is formed between the inner surface of the conduit 8 and the outer surface of the first wire body 3.

The pull-in rope 4 is made of a flexible material and includes a rope main body (a code main body) 14 which is a code member having an outer diameter sufficiently smaller than that of the later-described second wire body 13, and a connection member 15 which is attached to one end of the rope main body 14.

The rope main body 14 is made of a single core code of a diameter smaller than 2 mm, for example.

Figure 2:
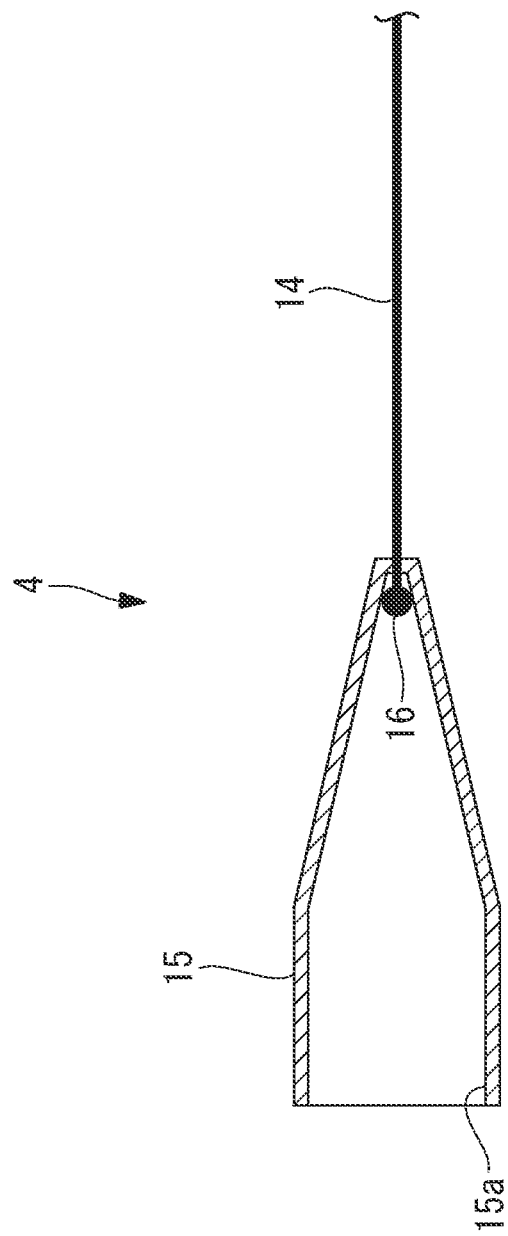
FIG. 2 is a longitudinal sectional view showing an example of a pull-in rope which is provided in the robot of FIG. 1.

As shown in FIG. 2, the connection member 15 has an opening (an accommodating opening) 15a which can accommodate the end portion of the second wire body 13 at one end, and an attachment portion 16 which is attached to the rope main body 14 at the other end. The connection member 15 is made of a flexible material having flexibility such as a resin and the like, and is formed in a taper shape from the opening 15a to the attachment portion 16, for example.

Figure 3:
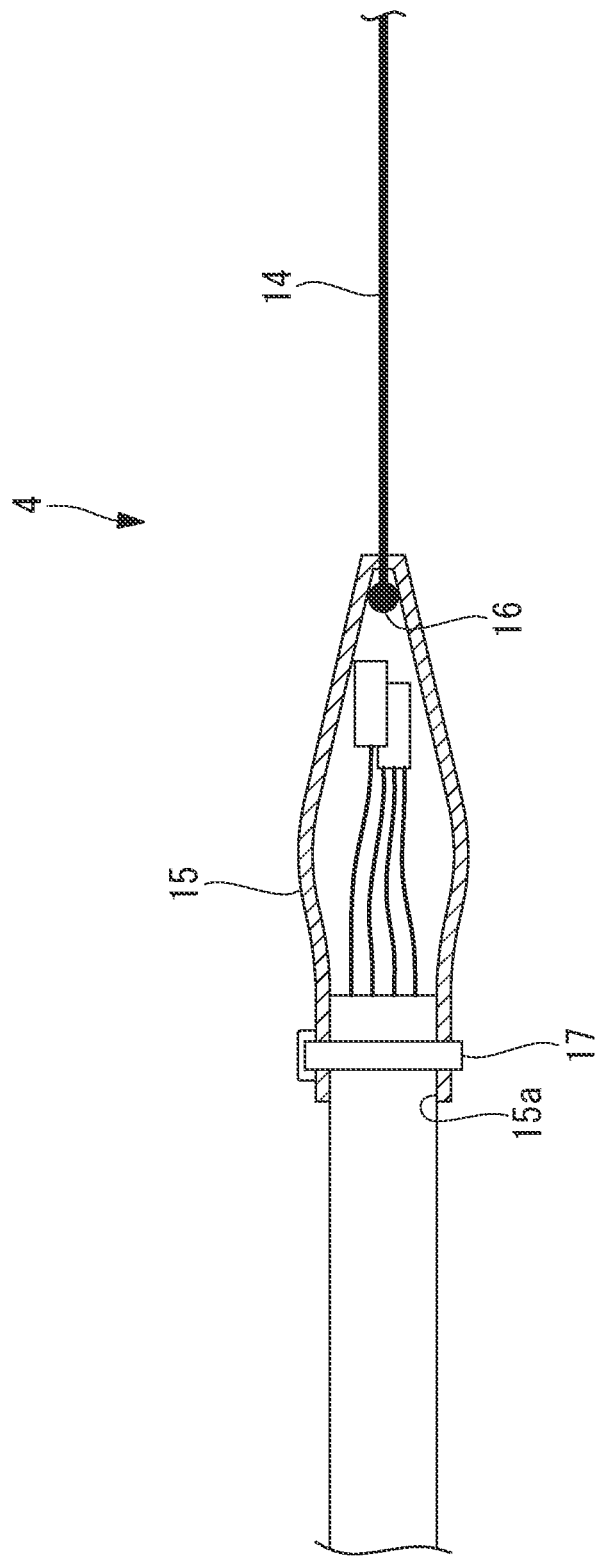
FIG. 3 is a longitudinal sectional view showing a state where the pull-in rope of FIG. 2 is connected to a second wire body.

Accordingly, as shown in FIG. 3, the connection member 15 can be reduced in the size in the radially inward direction by fastening the connection member 15 by means of a nylon band 17 and the like from the radially outward direction in a state where the end portion of the second wire body 13 is accommodated in the opening 15a. By this, the second wire body 13 and the pull-in rope 4 can be connected easily in a state where one end of the second wire body 13 is covered by the connecting member 15.

Figure 4:
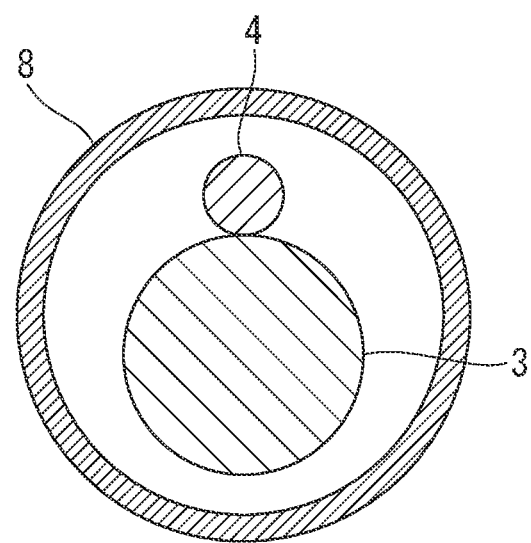
FIG. 4 is a side sectional view showing a flexible conduit, a first wire body, and the pull-in rope of the robot of FIG. 1.

As shown in FIG. 4, the pull-in rope 4 is arranged in a space between the inner surface of the conduit 8 and the outer surface of the first wire body 3 so that the pull-in rope 4 passes through the conduit 8 in the longitudinal direction. And, as shown in FIG. 1, the both ends of the pull-in rope 4 are fixed to the first wire body 3, the welding torch 100, or the wire feeding device 200 by means of nylon bands 18, for example, so as to be removable at positions where the both ends of the pull-in rope 4 are pulled outwardly from the openings located at both ends of the conduit 8.

As shown in FIG. 1, the connection member 15 which is attached to the one end of the pull-in rope 4 is fixed to the welding torch 100 by means of the nylon band 18, for example. Also, the other end side of the pull-in rope 4 has an extra length part which is long enough to extend outwardly from the opening of the conduit 8 and the other end side of the pull-in rope 4 is accommodated within or detachably fixed to the wire feeding device 200 in a state where the other end side of the pull-in rope 4 is fixed to the first wire body 3 by means of the nylon band 18 and the extra length part is rolled.

The second wire body (post-installation wire body) 13 is a wire body which is to be connected to a sensor (a work tool) 150 for detecting welding state by the welding torch 100, for example. The second wire body 13 includes a cable for supplying power and transmitting a detection signal to the sensor 150, and a pipe for supplying air for purging the sensor 150, for example. Usually, the sensor 150 and the second wire body 13 are attached to the robot 1 after installing the robot 1 to a place of use.

A function of the robot 1 according to this embodiment as described above will be explained below.

With the robot 1 according to this embodiment, when the wrist elements 9, 10, 11 are rotated with the movement of the wrist 7 of the robot 1, the flexible conduit 8 is curved or twisted in the penetration path 12 so as to follow movements of the wrist elements 9, 10, 11. The first wire body 3 is deformed when the conduit 8 is deformed, however, the first wire body 3 is protected since the space within the conduit 8 is maintained.

Also, when the first wire body 3 is deformed, the pull-in rope 4 is also deformed, however, large friction is not generated between the pull-in rope 4 and the first wire body 3 since the diameter of the pull-in rope 4 is sufficiently small and the space between the conduit 8 and the first wire body 3 is maintained. Further, a part of the first wire body 3 located at the fixed positions in the first wire body 3 is not significantly deformed since the pull-in rope 4 is fixed at the positions outside the openings provided at the both ends of the conduit 8. By this, large force is not applied to the first wire body 3 at the fixed positions of the pull-in rope 4, and the first wire body 3 is maintained in a good condition.

Subsequently, work for attaching the sensor 150, which is another work tool, to the distal end of the robot 1 according to this embodiment, and work for wiring the second wire body 13, which is to be connected to the sensor 150, within the conduit 8 will be explained.

Firstly, in order to release the fixed pull-in rope 4, the nylon bands 18 that fix the both ends of the pull-in rope 4 are cut, for example. Since the both ends of the pull-in rope 4 are fixed at positions located outside the opening of the conduit 8, it is easy to reach the fixing nylon bands 18 from outside to conduct the cutting and the like.

Figure 5:
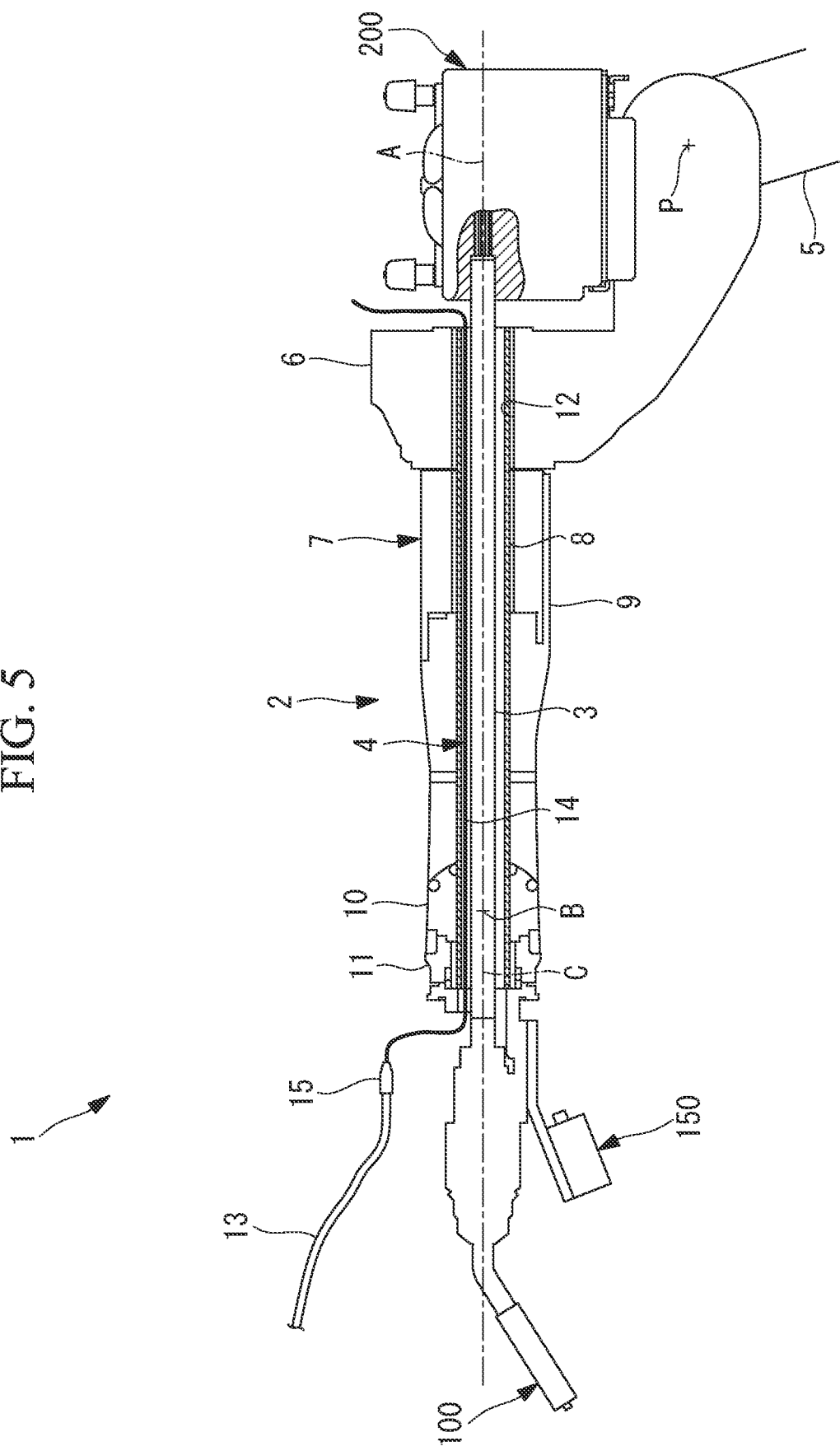
FIG. 5 is a longitudinal sectional view explaining wiring work of the second wire body in the robot of FIG. 1.

Next, as shown in FIG. 5, the one end of the second wire body 13 which is to be wired is connected to the connection member 15 which is attached to the one end of the welding torch 100 side of the pull-in rope 4. As shown in FIG. 3, the second wire body 13 is attached to the connection member 15 in a manner that the end portion of the second wire body 13 is accommodated within the opening 15a of the connection member 15 and fastened by means of the nylon band 17 from the outside of the connection member 15. The connection member 15 is reduced in the size in the radially inward direction by fastening force applied by the nylon band 17, and the connection member 15 and the second wire body 13 are fastened at the same time. By this, the one end of the second wire body 13 is connected to the one end of the pull-in rope 4.

Figure 6:
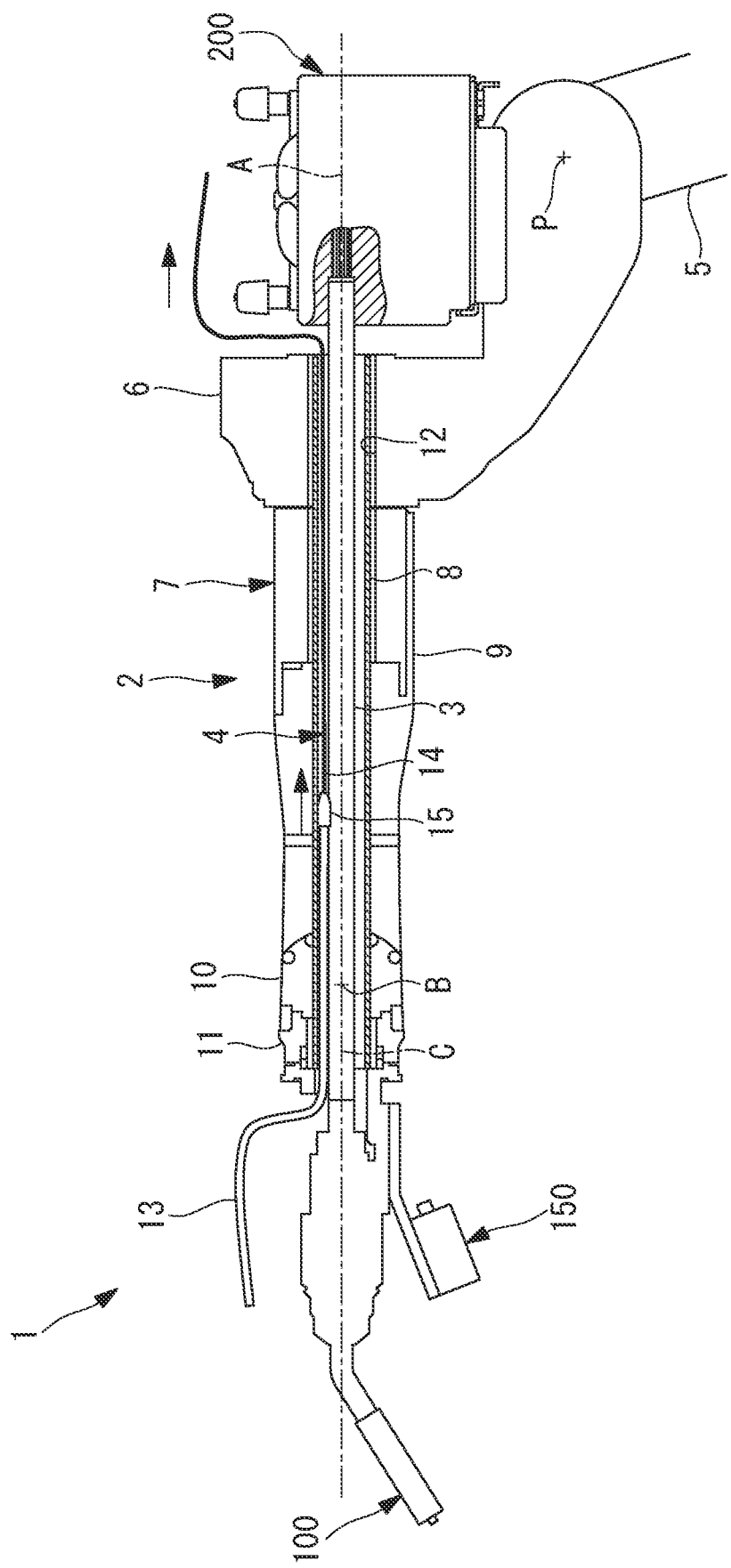
FIG. 6 is a sectional view showing a state where the second wire body is pulled to an intermediate position of a conduit in the robot of FIG. 1.

In this state, the other end of the pull-in rope 4, which is arranged at the rear part side of the forearm 6, is pulled in the length direction, as shown in FIG. 6. Since the other end of the pull-in rope 4 is provided with the extra length part, operators can grab the extra length part with a hand and apply pull force to the pull-in rope 4 easily without any tools.

Figure 7:
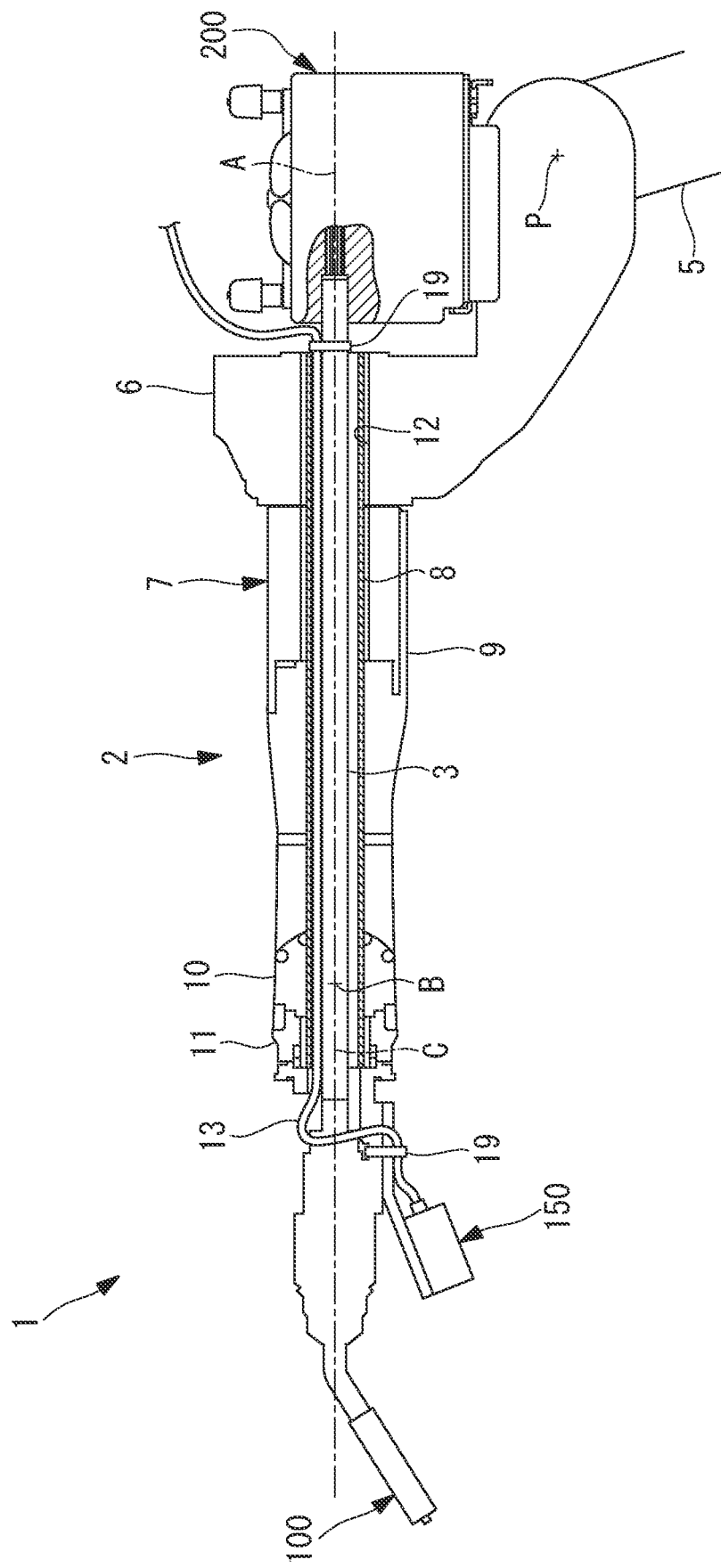
FIG. 7 is a longitudinal sectional view showing a state where the second wire body wired within the conduit is connected to a sensor in the robot of FIG. 1.

By this, the pull-in rope 4 to which the pull force is applied moves in the conduit 8 toward the forearm 6 side, and the second wire body 13 which is connected to the one end side of the connection member 15 is pulled into the conduit 8 from the opening located at the distal end side. By further pulling the pull-in rope 4, the connection member 15 located at the distal end of the pull-in rope 4 is pulled out from the opening located at the rear portion side of the conduit 8, as shown in FIG. 7. By this, the second wire body 13 is inserted into the conduit 8. With the second wire body 13 which is inserted into the conduit 8, the both ends of the second wire body 13 are detachably fixed to the first wire body 3, the welding torch 100, or the wire feeding device 200 by means of nylon bands 19 at positions where the both ends of the second wire body 13 are pulled out from the openings located at the both ends of the conduit 8.

In this case, since the connection member 15 covers the one end of the second wire body 13, the operators can carry out operations in such a manner that the one end of the second wire body 13 is not caught by the inner part of the conduit 8 during a period from the start of pulling the second wire body 13 into the conduit 8 until the end of taking the second wire body 13 out from the conduit 8. Further, since the connection member 15 is formed into the tapered shape toward the pull-in rope 4, it is possible to prevent the connection member 15 from being caught by the inner part of the conduit 8 when pulling the second wire body 13 into the conduit 8 or moving the second wire body 13 in the conduit 8, and therefore, smooth movement of the second wire body 13 is achieved.

Accordingly, the one end of the second wire body 13 is smoothly pulled into the conduit 8 and smoothly pass through the conduit 8 by pulling the pull-in rope 4 and pull out the pull-in rope 4 from the conduit 4 so that the second wire body 13 can easily be arranged in a state where the second wire body 13 goes through the conduit 8, which is advantageous.

That is, with the robot 1 according to this embodiment, it is not required to wire the second wire body 13 for the sensor 150, which is the work tool to be prepared by a user after installing the robot 1 at a place of use, in the conduit 8 at the time of manufacturing the robot 1, and the user can wire a desirable second wire body 13.

Also, even the unfamiliar users can carry out the wiring work of the second wire body 13 easily since the wiring work only includes connecting the pull-in rope 4 and the second wire body 13 and pulling the pull-in rope 4 out from the conduit 8.

Figure 8:
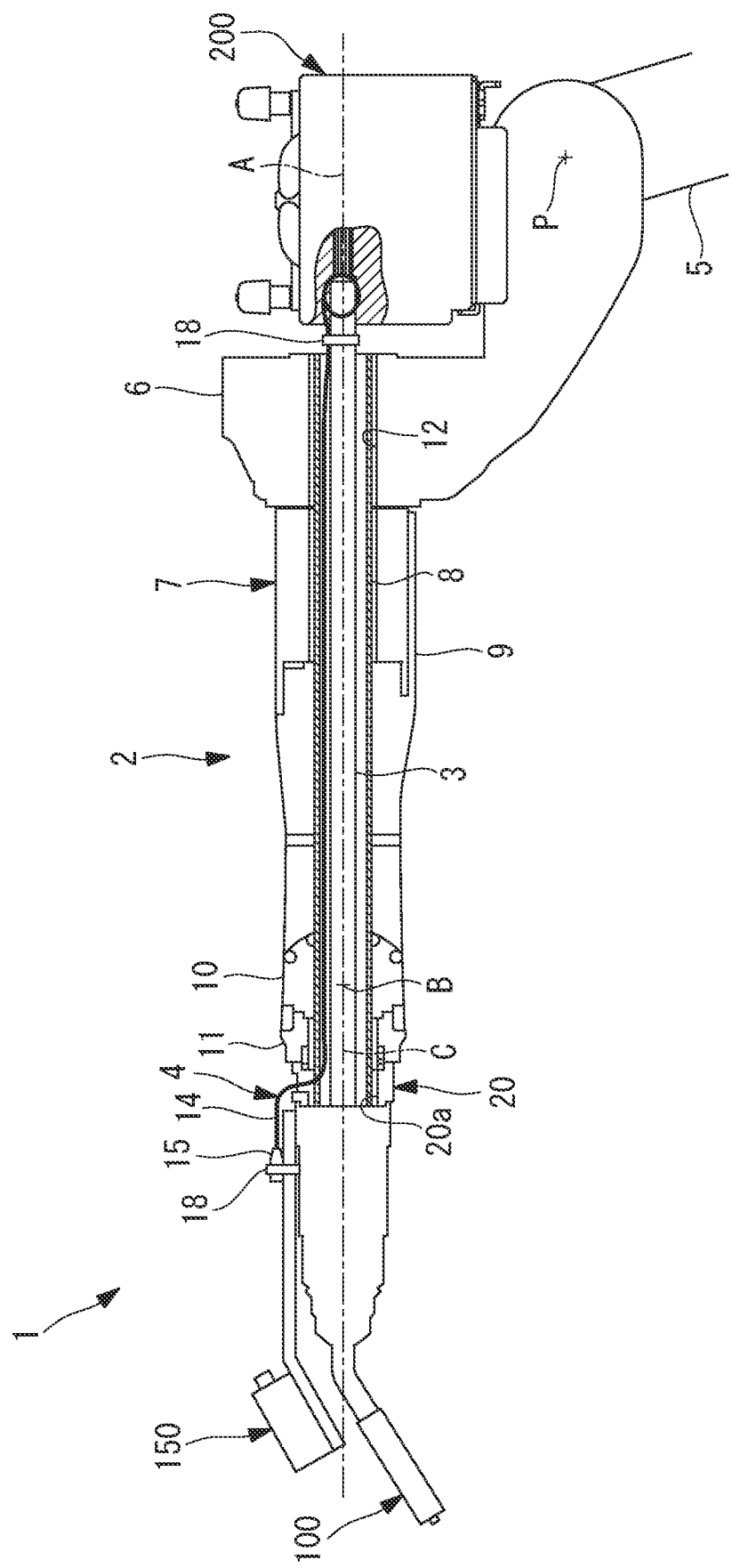
FIG. 8 is a longitudinal sectional view showing a modified example of the robot of FIG. 1.

Further, in this embodiment, the pull-in rope 4 is fixed to the first wire body 4 and the like by means of the nylon bands 18 at positions where the both ends of the pull-in rope 4 are exposed from the openings of the both ends of the conduit 8. Instead of this, as shown in FIG. 8, an adapter 20 may be attached at a position located between the flange surface of the third wrist element 11 and the work tools 100, 150. An opening 20a for pulling the pull-in rope 4 out from the conduit 8 in the radially outward direction is provided to the adapter 20 so that the pull-in rope 4, which is pulled out from the opening 20a, can be fixed to the work tools 100, 150 and the like.

Also, the second wire body 13, which is to be connected to the sensor 150, is disclosed in this embodiment, however, a second wire body 13 which is to be connected to any other work tool may be adopted. Moreover, the pull-in rope 4 is detachably fixed to the first wire body 3 and the like by means of the nylon band 18, however, the pull-in rope 4 may be detachably fixed by any other means such as a hook, loop fastener, or the like.

Figure 9:
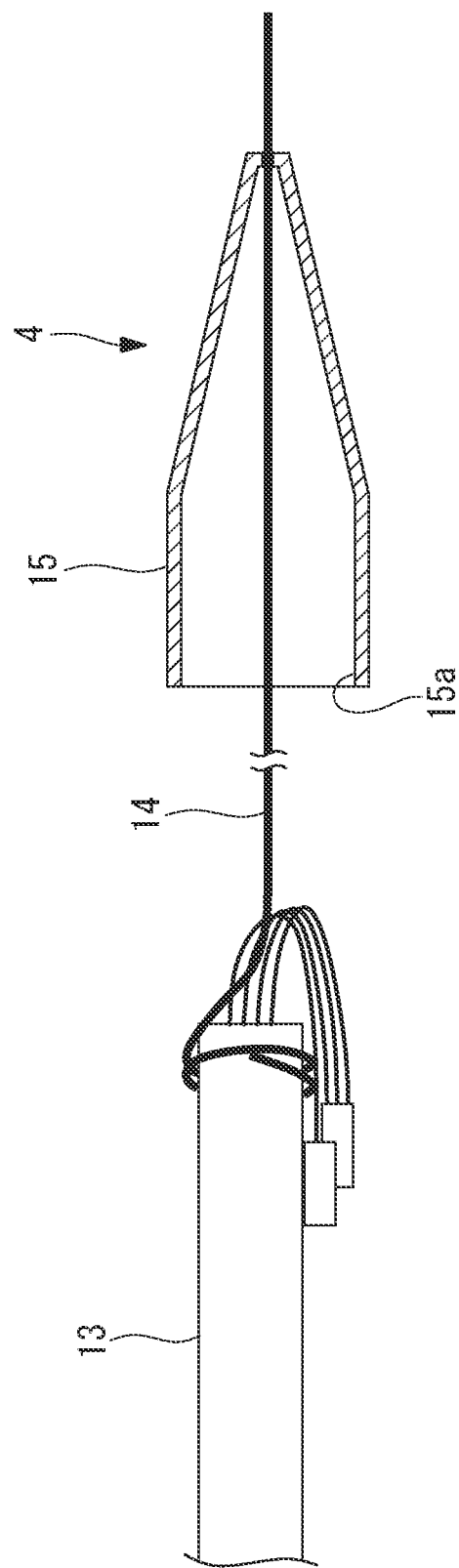
FIG. 9 is a longitudinal sectional view showing a modified example of the pull-in rope of FIG. 2.
Figure 10:
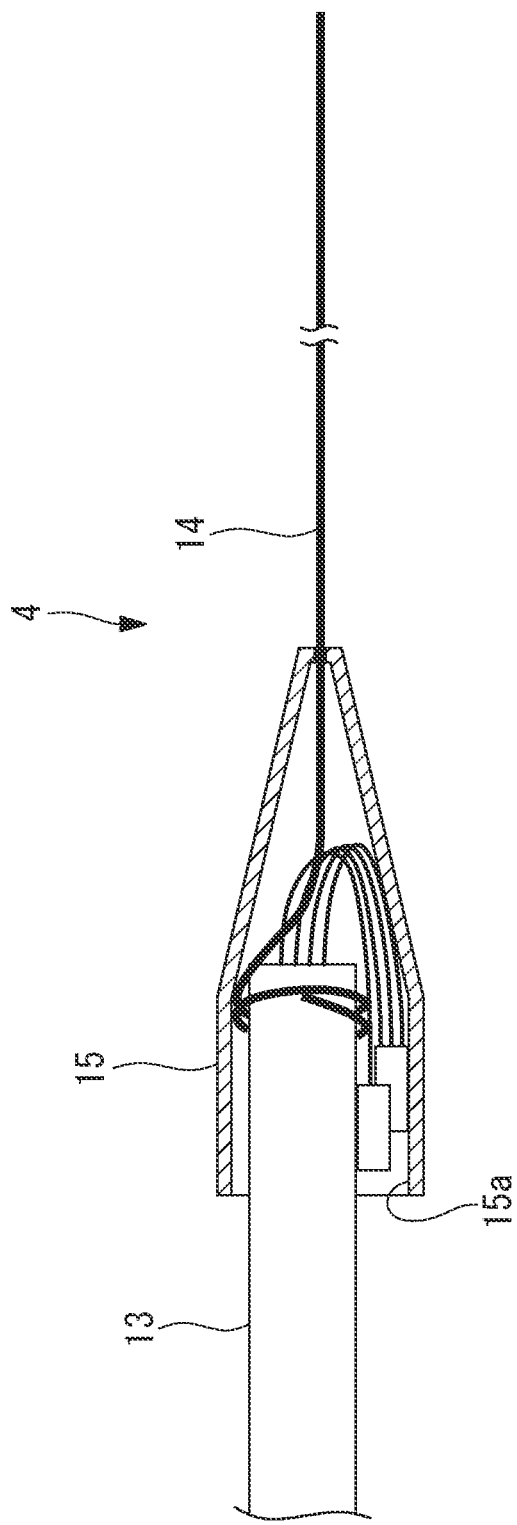
FIG. 10 is a longitudinal sectional view showing a state where an end portion of the second wire body is covered by a connection member of the pull-in rope of FIG. 9.

Further, the pull-in rope 4 and the second wire body 13 are connected with each other by fastening the connection member 15 together with the second wire body 13 by the nylon band 17. Instead of this, as shown in FIGS. 9 and 10, the connection member 15 may be made of a cylindrical member attached to the pull-in rope 4 so as to be movable in the longitudinal direction, and the connection member 15 may cover a connection portion which connects the rope main body 14 and the second wire body 13.

In this case, the pull-in rope 4 and the second wire body 13 may be connected by tying a knot of the rope main body 14 around the second wire body 13 or fastening the rope main body 14 and the second wire body 13 by means of the nylon band 17. By this, it is possible to prevent the nylon band 17 from being exposed to the outside of the connection member 15, and it is possible to pull the second wire body 13 into the conduit 8 more easily.

Moreover, the deformable resin member is illustrated as the connection member 15, however, the connection member 15 may be made of a foldable bag-shaped member and is fixed to the first wire body 3 and the like in the folded state, for example. Also, a metallic member which is plastically deformable in the radial direction may be adopted as the connection member 15, and the pull-in rope 4 and the second wire body 13 are connected by crushing the connection member 15 which accommodates the second wire body 13 in the opening 15a of the connection member 15 in the radial direction.

Further, this embodiment illustrates a case having a single pull-in rope 4, however, a plurality of pull-in ropes 4 may be included. Alternatively, the robot 1 may include a single pull-in rope 4, and when the second wire body 13 is pulled into the conduit 8, another pull-in rope 4 may be pulled together into the conduit 8 so that the pulled pull-in rope 4 can be used when pulling another second wire body 13.

And, this embodiment illustrates the welding torch 100 and the sensor 150 as the work tools, which are not limited to the tools. Also, the number of the work tools is not limited to two.

The invention claimed is:
1. A robot comprising:
a forearm;
a wrist whose proximal end side is connected to the forearm so as to be rotatable around a first axis and to which a work tool is attached at a distal end side of the wrist;
a flexible conduit arranged along the first axis from the forearm to a distal end of the wrist, the flexible conduit having openings at both ends thereof; and
a pull-in cord body which is arranged so as to pass through the conduit in an axis direction of the conduit and which is capable of being pulled out from at least one of the openings located at a side of the forearm of the conduit, wherein
both ends of the pull-in cord body are detachably fixed to positions capable of being handled from outside the conduit,
wherein the pull-in cord body includes a cord main body and a connection member on an end portion of the cord main body, the end portion is positioned at a side of the work tool, the connection member can be connected to an end portion of a post-installation wire body, and the post-installation wire body is to be wired in the conduit.
2. The robot according to claim 1, wherein the both ends of the pull-in cord body are fixed to an outside of the conduit relative to the openings located at the both ends of the conduit.
3. The robot according to claim 1, wherein the work tool is fixed to the distal end of the wrist, and a wire body for the work tool is inserted into the conduit in the axis direction so as to be wired.

4. The robot according to claim 1, wherein the connection member has an accommodating opening which is capable of accommodating the end portion of the post-installation wire body at an one end of the connection member and an attachment portion which is attached to the cord main body at another end of the connection member, and the connection member is formed in a tapered shape from the accommodating opening to the attachment portion.

5. The robot according to claim 4, wherein the connection member is formed in a bag shape made of a foldable material.

* * * * *